(12) United States Patent
Morita et al.

(10) Patent No.: US 7,863,391 B2
(45) Date of Patent: Jan. 4, 2011

(54) ORGANOPOLYSILOXANE AND CURABLE SILICONE COMPOSITION THAT CONTAINS AFOREMENTIONED ORGANOPOLYSILOXANE

(75) Inventors: Yoshitsugu Morita, Ichihara (JP); Hiroshi Ueki, Ichihara (JP); Minoru Isshiki, Otsu (JP)

(73) Assignee: Dow Corning Toray Company, Ltd., Tokyo (JP)

( * ) Notice: Subject to any disclaimer, the term of this patent is extended or adjusted under 35 U.S.C. 154(b) by 0 days.

(21) Appl. No.: 11/576,628

(22) PCT Filed: Sep. 28, 2005

(86) PCT No.: PCT/JP2005/018404

§ 371 (c)(1),
(2), (4) Date: Dec. 18, 2007

(87) PCT Pub. No.: WO2006/038638

PCT Pub. Date: Apr. 13, 2006

(65) Prior Publication Data

US 2008/0207848 A1 Aug. 28, 2008

(30) Foreign Application Priority Data

Oct. 4, 2004 (JP) ............... 2004-291549

(51) Int. Cl.
*C08L 83/06* (2006.01)
*C08G 77/04* (2006.01)

(52) U.S. Cl. ............... 525/476; 525/477; 528/27
(58) Field of Classification Search ............... 525/476
See application file for complete search history.

(56) References Cited

U.S. PATENT DOCUMENTS

| | | | |
|---|---|---|---|
| 3,971,747 A * | 7/1976 | Bank et al. | 523/435 |
| 4,400,676 A * | 8/1983 | Mitsui | 336/205 |
| 4,927,884 A * | 5/1990 | Iwasawa et al. | 525/195 |
| 5,084,591 A * | 1/1992 | Shinohara et al. | 556/479 |
| 5,206,328 A | 4/1993 | Okamura et al. | |
| 5,891,969 A * | 4/1999 | Mine et al. | 525/476 |
| 6,194,482 B1 * | 2/2001 | Lehner et al. | 522/111 |
| 6,194,525 B1 * | 2/2001 | Ortiz et al. | 525/42 |
| 6,831,145 B2 * | 12/2004 | Kleyer et al. | 528/23 |
| 6,875,795 B2 * | 4/2005 | Irifune | 522/31 |
| 2002/0156187 A1 | 10/2002 | Greene | |
| 2003/0162929 A1 | 8/2003 | Verbruggen et al. | |
| 2003/0232900 A1 * | 12/2003 | Irifune | 522/6 |
| 2004/0076391 A1 * | 4/2004 | Ghoshal et al. | 385/123 |

FOREIGN PATENT DOCUMENTS

| | | |
|---|---|---|
| EP | 0460589 A1 | 12/1991 |
| JP | 08-099979 | 4/1996 |
| JP | 10-036511 | 2/1998 |
| JP | 2000-017176 | 1/2000 |

OTHER PUBLICATIONS

PCT/JP2005/018723 International Search Report, Mar. 4, 2006, 3 pages.
Craig M Whitaker et al., "Synthesis and Solid-State Structure of Substituted Arylphospine Oxides", J. Org. Chem. 1995, 60, 3499-3508.
Kevin C. Grega et al., "Regioselective Metalation of Fluoroanilines, An Application to the Synthesis of Fluorinated Oxazolidinone Antibacterial Agents", J. Org. Chem, 1995, 60, 5255-5261.
Stevan Djuric et al., "Silicon in Synthesis: Stabase Adducts—A New Primary Amine Protecting Group: Alkylation of Ethyl Glycinate", Tetrahedron Letters, vol. 22, No. 19, pp. 1787-1790, 1981.
R. B. Weisenfeld et al., "Protection of a 2,6-Dialkylaniline: Synthesis of 4-Dimethylmethyoxysilyl-2, 6-Diethylaniline", Synthetic Communications, 16(7), 809-817 (1986).
Amy S. Manoso et al., "Improved Synthesis of Aryltriethoxysilanes via Palladium(0)-Catalyzed Silylation of Aryl Iodides and Bromides with Triethoxysilane", J. Org. Chem. 2001, 66, 7449-7455.
Thomas I. Guggenheim, Protection of Substituted Anilines With 1,1,4,4-Tetrarnethyl-1,4-Bis(N,N-Diniethylamino) Disilethylene, Tetrahedron Letters, vol. 25, No. 12, pp. 1253-1254, 1984.
A.P. Davis et al., "The "Benzostabase" Protecting Group for Primary Amines; Application to Aromatic Amines", Tetrahendron Letters, vol. 31, No. 46, pp. 6721-6724, 1990.
Robert B. Weisenfeld, "Synthesis of Disiloxanediyl Diamines via a Facile Homocondensation of Amino Silanols", J. Org. Chem. 1986, 51, 2434-2436.
English language translation and abstract for JP08-099979, 18 pages.
English language translation and abstract for JP2000-017176, 14 pages.
English language translation and abstract for JP10-036511, 18 pages.

\* cited by examiner

*Primary Examiner*—Randy Gulakowski
*Assistant Examiner*—Mike Dollinger
(74) *Attorney, Agent, or Firm*—Howard & Howard Attorneys PLLC

(57) ABSTRACT

A curable silicone composition containing an organopolysiloxane that contains in one molecule at least one epoxy-containing organic group, has a polystyrene-referenced weight-average molecular weight at least 500, and is expressed by the following general unit formula: $(RSiO_{3/2})_x [R^1{}_a SiO_{(4-a)/2}]_y$ (where R represents a cycloalkyl group, and $R^1$ represents hydrogen atom or a univalent organic group, except for an aromatic group and a cycloalkyl group, at least one $R^1$ in one molecule being an epoxy-containing univalent organic group, and where the following condition is observed: $0 < a \leq 3$; $x > 0$; $y > 0$; and $x+y=1$).

7 Claims, No Drawings

ORGANOPOLYSILOXANE AND CURABLE SILICONE COMPOSITION THAT CONTAINS AFOREMENTIONED ORGANOPOLYSILOXANE

RELATED APPLICATIONS

This application claims priority to and all the advantages of International Patent Application No. PCT/JP2005/018404, filed on Sep. 28, 2005, which claims priority to Japanese Patent Application No. JP2004-291549, filed on Oct. 4, 2004.

TECHNICAL FIELD

The present invention relates to organopolysiloxanes, compositions that contain such organopolysiloxanes, and to application of such composition.

BACKGROUND ART

Recently, in the field of production of optical parts, such as optical elements that radiate or pass ultraviolet rays, there has been a tendency toward a significant increase in brightness and intensity of light. However, epoxy-type organic materials that are conventionally used for such optical elements have low resistance to ultraviolet rays and can easily change their color to brown after long exposure to ultraviolet radiation. On the other hand, cured bodies of curable silicone compositions that contain polydimethylsiloxanes show high resistance to heat and ultraviolet radiation, and therefore the optical parts that are made from epoxy-type organic resins and are associated with radiation or passage of ultraviolet rays are now being replaced by optical parts made from curable silicone compositions of a polydimethylsiloxane type.

However, a problem associated with the use of curable silicone compositions and cured bodies of curable silicone compositions of a polydimethylsiloxane type is that their refractive index of 1.41 is lower than that of an epoxy resin, and therefore optical parts that utilize cured bodies of the aforementioned compositions cannot provide high brightness of light. It has been found that refractive index can be increased to the level of epoxy-resin type organic materials by introducing compositions that contain phenyl groups, such as polydimethyl-diphenyl siloxane type or polymethylphenyl siloxane type curable silicone compositions.

Even though the aforementioned phenyl-containing curable silicone compositions appeared to be superior to the epoxy-type organic resin materials with regard to ultraviolet (UV)-ray resistance, they still could not reach in their UV radiation resistance the level of the polydimethylsiloxane-type curable silicone compositions. Examples of such copolymers are given in Japanese Unexamined Patent Application Publication (hereinafter Kokai) H10-36511 that discloses copolymers composed of siloxane units that contain cyclohexyl or cyclopentyl groups, as well as silanol and phenyl groups. The publication also shows examples of cured bodies of the aforementioned copolymers. However, since phenyl groups are indispensable constituents of such copolymers, the cured bodies thereof have a high index of refraction, therefore, low resistance to UV rays.

For addition-reaction curing, known curable silicone compositions are compounded with platinum catalysts (see, e.g., Kokai 2000-17176), but when such compositions are exposed to UV radiation, under the effect of UV rays and heat the platinum catalysts contained in the composition are colored, whereby a cured body of the composition is turned into something between brown and yellow.

DISCLOSURE OF INVENTION

It is an object of the present invention to solve the problems of the prior art by providing a curable silicone composition, especially one for optical applications, that simultaneously incorporates such properties as high resistance to heat, high refractive index, and resistance to UV rays. It is another object to provide a cured body of the aforementioned composition.

It is still another object of the invention to provide a curable silicone composition which is free of a platinum catalyst that changes its color under the effect of UV rays and heat.

Based on the results of studies, the inventors herein have found that the above objects can be achieved by utilizing a cycloalkyl-containing organopolysiloxane that provides a cured body of the composition with a high index of refraction, and by obviating the use of a platinum catalyst, due to cross-linking of epoxy groups, that imparts to the cured body of the composition high resistance to UV rays. Thus the inventors arrived at the present invention.

More specifically, according to one embodiment of the invention, it is proposed to use organopolysiloxane (A) that contains in one molecule at least one epoxy-containing organic group, has a polystyrene-referenced weight-average molecular weight at least 500, and is expressed by the following general unit formula:

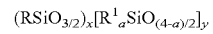
$(RSiO_{3/2})_x[R^1{}_aSiO_{(4-a)/2}]_y$ (where R represents a cycloalkyl group, and $R^1$ represents hydrogen atom or a univalent organic group, except for an aromatic group and a cycloalkyl group, at least one $R^1$ in one molecule being an epoxy-containing univalent organic group, and where the following condition is observed: $0<a\leq3$; $x>0$; $y>0$; and $x+y=1$).

According to another embodiment of the invention, it is proposed to use a curable silicone composition that contains, as indispensable components, aforementioned organopolysiloxane (A) and a curing agent (B) for component (A). The aforementioned curable silicone composition may be in a liquid or a paste-like form.

The curable silicone composition may further include an organopolysiloxane (C) that contains in one molecule at least one epoxy-containing organic group and that is represented by the following average unit formula:

$R^2{}_bSiO_{(4-2)/2}$ (where $R^2$ is hydrogen atom or a univalent organic group, except for an aromatic group and a cycloalkyl group, at least one $R^2$ in one molecule being an epoxy-containing univalent organic group; and where the following condition is observed: $0.1<b\leq3$).

Aforementioned component (B) may be a combination of a silicon-bonded alkoxy compound or a silanol-containing compound with an organoaluminum compound.

The curable silicone composition of the invention can be cured by heating and is most suitable for use in conjunction with optical parts.

From the point of view of their resistance to heat, index of refraction, and resistance to UV rays, the organopolysiloxane of the invention and the curable silicone composition that contains the aforementioned organopolysiloxane are most suitable for use in the field of optics.

BEST MODE FOR CARRYING OUT THE INVENTION

The following is a more detailed description of the organopolysiloxane of the invention.

Organopolysiloxane (A) of the invention is represented by the following average unit formula:

$(RSiO_{3/2})_x[R^1_aSiO_{(4-a)/2}]_y$ (where R represents a cycloalkyl group, and $R^1$ represents hydrogen atom or a univalent organic group, except for an aromatic group and a cycloalkyl group, at least one $R^1$ in one molecule being an epoxy-containing univalent organic group, and where the following condition is observed: $0<a\leq3$; $x>0$; $y>0$; and $x+y=1$).

A cycloalkyl group can be represented, e.g., by cyclopropyl, cyclobutyl, cyclopentyl, cyclohexyl, cycloheptyl, or a similar group. Most preferable are cyclopentyl and cyclohexyl groups, and especially a cyclohexyl group.

A univalent organic group can be exemplified by a vinyl, allyl, butenyl, pentenyl, hexenyl, or a similar alkenyl group; a methyl, ethyl, propyl, butyl, pentyl, hexyl, heptyl, or a similar alkyl group; and a chloromethyl, 3-chloropropyl, 3,3,3-trifluoropropyl, or a similar halogenated alkyl group, as well as other substituted or unsubstituted univalent hydrocarbon groups. Preferably $R^1$ is a univalent organic group, and most preferable univalent organic groups are univalent hydrocarbon groups, preferably, alkyl groups, and especially, methyl groups.

The aforementioned epoxy-containing univalent organic group may be represented by any univalent hydrocarbon group that contains an epoxy group, e.g., by a glycidoxyethyl, glycidoxypropyl, glycidoxybutyl, 3,4-epoxycyclohexylethyl, 3,4-epoxycyclohexylpropyl, 3,4-epoxynorbornenylethyl, 2-(3,4-epoxy-3-methylcyclohexyl)-2-methylethyl, etc. One molecule may contain one, two, or more of such epoxy-containing organic groups.

In the above formula, "x" is a number higher than 0, preferably, within the range of 0.2 to 0.9, more preferably, 0.4 to 0.9; "y" is a number higher than 0, preferably, within the range of 0.1 to 0.8, more preferably, 0.1 to 0.6; x+y equal 1.

The polystyrene-referenced weight-average molecular weight of organopolysiloxane (A) should be at least 500, preferably, within the range of 800 to 80,000, and even more preferably, 1000 to 20,000.

Organopolysiloxane (A) may be composed of a siloxane resin of one type or of a mixture of siloxane resins of two or more types. At room temperature of 25° C., organopolysiloxane (A) may be liquid, paste-like, or solid. If it is solid, it can be mixed with other components by using an organic solvent. The liquid or paste-like form is more convenient for the preparation of the below-described curable silicone composition of the invention.

Silicone resins represented by the following formulae can be shown as examples of preferable resins for organopolysiloxane (A):

$(R'SiO_{3/2})_x[(CH_3)_2SiO_{2/2}]_z[ECH_3SiO_{2/2}]_w$ $(R'SiO_{3/2})_x[(CH_3)_2SiO_{2/2}]_z[YCH_3SiO_{2/2}]_w$ $(R'SiO_{3/2})_x[ECH_3SiO_{2/2}]_z$ $(R'SiO_{3/2})_x[YCH_3SiO_{2/2}]_z$ $(R'SiO_{3/2})_x(CH_3SiO_{3/2})_z[ECH_3SiO_{2/2}]_w$ $(R'SiO_{3/2})_x(CH_3SiO_{3/2})_z[YCH_3SiO_{2/2}]_w$

{where R' is a cyclohexyl group, E is a 3-glycidoxypropyl group, Y is a 3,4-epoxycyclohexylethyl group, $x>0$, $z>0$, $w>0$; $z+w=y$ (where "y" is the same as defined above), and $x+w+z=1$}.

Organopolysiloxane (A) can be prepared, e.g., by dealcoholation and condensation of a cyclohexyltrimethoxysilane, or a similar cycloalkyltrialkoxysilane, and γ-glycidoxypropyltrimethoxysilane, γ-glycidoxypropylmethyldimethoxysilane, 2,3-epoxycyclohexyl-ethyltrimethoxysilane, or a similar epoxy-containing alkoxysilane.

Other methods may consist of causing a hydrosilation reaction between a compound that has epoxy-containing organic groups and aliphatic unsaturated groups and an SiH-group-containing organopolysiloxane prepared, e.g., by co-hydrolysis and condensation of a cyclohexyltrichlorosilane, or a similar cycloalkyltrihalosilane or a cyclohexyltrimethoxysilane, or a similar cycloalkyltrialkoxysilane, in the presence of a dimethylchlorosilane, or a similar SiH-containing silane.

Examples of other processes are the following: a method wherein silanol groups contained in the silicone prepared by the above-described method may be subjected to re-equilibrium polymerization in the presence of a trimethylsiloxy-capped methylvinylsiloxane and a basic polymerization catalyst; a method wherein a silicone resin composed of $RSiO_{3/2}$ units (where R is a cycloalkyl group) and a cyclic methylvinylsiloxane can be subjected to re-equilibrium polymerization in the presence of a basic catalyst; and a method wherein a silicone resin composed of $RSiO_{3/2}$ units (where R is a cycloalkyl group) and a cyclic methylvinylsiloxane and cyclic dimethylsiloxane can be subjected to re-equilibrium polymerization in the presence of an acidic or basic catalyst.

A part of the residue contained in organopolysiloxane (A) may be comprised of silanol and alkoxy groups originating from the aforementioned preparation methods.

Organopolysiloxane (A) is suitable for use as an optical material as it has a high index of refraction and does not change its color after long exposure to heat and UV radiation.

The following is a description of the curable silicone composition of the invention.

The curable organopolysiloxane composition of the invention consists of aforementioned organopolysiloxane (A) and its curing agent (B). There are no special restrictions with regard to curing agent (B) of the composition, provided that it contains, as an indispensable component, a compound reactive with epoxy groups (an epoxy-reactive compound), but a combination of an epoxy-reactive compound with a catalyst is preferable. Arbitrarily, the aforementioned combination may be further compounded with a curing accelerator.

The epoxy-reactive compound may be exemplified by 3-glycidoxypropyl trimethoxysilane (γ-glycidoxypropyl-trimethoxysilane), 3-glycidoxypropyl-methyldimethoxysilane, 3-glycidoxypropyl-triethoxysilane, and 3-glycidoxypropyl-methyldiethoxysilane or β-(3,4-epoxycyclohexyl)ethyltrimethoxysilane, or similar silicon-bonded alkoxy-containing compounds; silanol-containing compounds of the following formula:

$HOSiR^3R^4$—$(OSiR^5R^6)_m$—$OSiR^7R^8OH$ (where $R^3$, $R^4$, $R^5$, $R^6$[[m]], $R^7$, and $R^8$ independently designate aforementioned univalent organic groups, and "m" is an integer within the range of 1 to 30); as well as acid anhydrides, carboxylic acids, amines, phenols, alcohols, mercaptans, or similar active hydrogen-containing compounds. One type or a mixture of two or more types of the epoxy-reactive compounds can be used.

The catalyst can be represented by a metalloorganic compound bonded to an organic group selected from an alkyl group, substituted or unsubstituted phenyl group, or a similar aryl group, haloalkyl group, alkoxyl group, substituted or unsubstituted phenoxy group, or a similar aryloxy group, acyloxy group, β-diketonate group, and o-carbonyl phenolate. Most preferable of these metalloorganic compounds are organoaluminum and organozirconium compounds.

The aforementioned organic groups can be exemplified by alkyl groups, such as a methyl, ethyl, n-propyl, isopropyl, n-butyl, sec-butyl, t-butyl, and n-pentyl group; substituted and unsubstituted phenyl groups, such as a phenyl, p-methoxyphenyl, o-methoxyphenyl, and p-ethoxyphenyl group; haloalkyl groups, such as a chloromethyl and chloropropyl group; alkoxyl groups, such as a methoxy, ethoxy, isopropoxy, butoxy, and pentoxy group; substituted and unsubstituted phenoxy groups, such as a phenoxy, o-methylphenoxy, o-methoxyphenoxy, o-nitrophenoxy, and 2,6-dimethylphenoxy group; acyloxy groups, such as an acetate, propionate, isopropionate, stearate, ethylacetoacetate, propylacetoacetate, butylacetoacetate, diethylmaleate, and dipivaloylmethanate group; β-diketonate groups, such as acetylacetonate, trifluoroacetylacetonate, hexafluoroacetylacetonate, and a group represented by the following formulae:

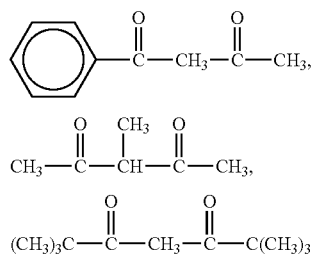

and o-carbonylphenolate groups, such as salicylaldehydate.

The metalloorganic compounds can be exemplified by a trimethoxy aluminum, triethoxy aluminum, triisopropoxy aluminum, triphenoxy aluminum, tri(p-methylphenoxy) aluminum, isopropoxydiethoxy aluminum, tributoxy aluminum, triacetoxy aluminum, tristearate aluminum, tributylate aluminum, tripropionate aluminum, tri-isopropionate aluminum, tris(acetylacetonate) aluminum, tris(fluoroacetylacetonate) aluminum, tris(salicylaldehydate) aluminum, tris(pentafluoroacetylacetonate) aluminum, tris(ethylacetate) aluminum, ethylacetate-diisopropoxy aluminum, tris(diethylmaleate) aluminum, tris(propylacetoacetate) aluminum, tris(butylacetoacetate) aluminum, tris(isopropylacetoacetate) aluminum, tris(dipivaloylmethanate) aluminum, diacetylacetonate (dipivaloylmethanate) aluminum, ethylacetoacetate-diisopropoxy aluminum, and a compound of the following formulae:

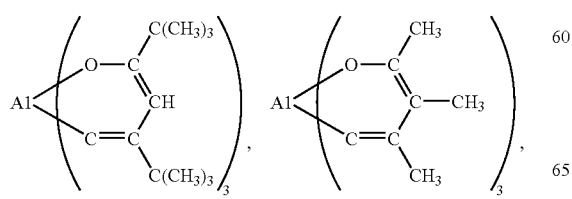

-continued

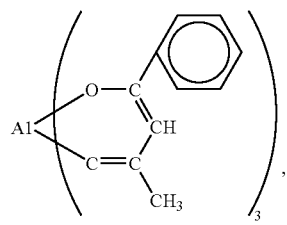

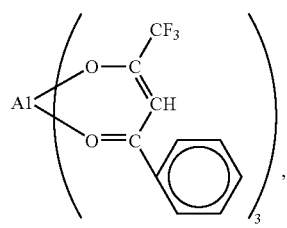

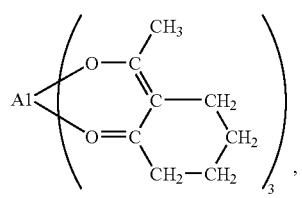

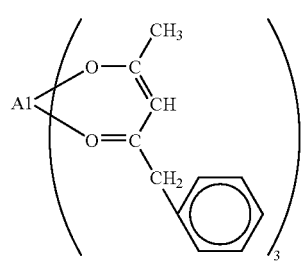

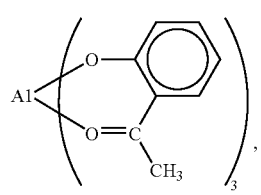

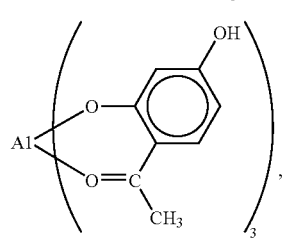

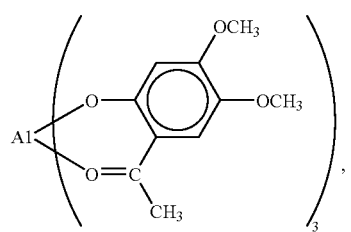

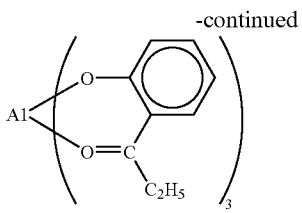

The following are examples of the organozirconium compounds: tri-n-butoxy-ethylacetoacetate zirconium, di-n-butoxy-bis(ethylacetoacetate) zirconium, n-butoxy-tris(ethylacetoacetate) zirconium, tetrakis(n-propylacetoacetate) zirconium, tetrakis(acetylacetoacetate) zirconium, tetrakis(acetylacetoacetate) zirconium, and tetrakis(ethylacetoacetate) zirconium. Among these, most preferable from the point of view of their high reactivity and availability are organoaluminum compounds, especially, acetoalkoxyaluminum diisopropylate. The composition may contain a catalyst of one, two, or more types in a mixture.

The curing accelerator can be exemplified by a triethylamine, benzyldimethylamine, α-methylbenzyldimethylamine, 1,8-diazabicyclo[5.4.0]undec-7-ene, or a similar tertiary amine; triphenylphosphine, tributylphosphine, tri(p-methylphenyl) phosphine, tri(nonylphenyl) phosphine, triphenylphosphine-triphenylborate, tetraphenylphosphine-tetraphenylborate, or similar phosphororganic compounds; 2-methylimidazole, 2-phenylimidazole, 2-phenyl-4-methylimidazole, or similar imidazole compounds; boron complex compounds; organic ammonium salts; organosulfonic salts; organic peroxides; and their reaction products. One, two, or more types of the curing accelerators can be used in a mixture.

A combination of a silicon-bonded alkoxy compound or a silanol-containing compound with an organoaluminum compound is most preferable for preventing deterioration of properties or discoloration under the effect of heat and UV rays.

There are no special restrictions with regard to the added amount of curing agent (B) relative to organopolysiloxane (A), provided that this amount is sufficient for curing the entire silicone composition. When component (B) is combined with a silicon-bonded alkoxy-containing compound or silanol-containing compound and an organoaluminum compound, component (B) should be added in a sufficient catalytic quantity. In this case, it is recommended to add component (B) in the amount of 1 to 100 parts by weight, preferably, 1 to 10 parts by weight, and even more preferably, 1 to 5 parts by weight, per 100 parts by weight of component (A). If component (B) is a compound that contains active hydrogen, it should be combined with approximately the same amount of component (A). In this case, component (B) is typically added in the amount of 50 to 250 parts by weight, and more typically, in the amount of 100 to 200 parts by weight, per 100 parts by weight of component (A).

Curing of the curable silicone composition composed of organopolysiloxane (A) and its curing agent (B) may be carried out at room temperature or with heating. Curing with heating is preferable for speeding the process. The heating temperature can be within the range of 50° C. to 200° C.

A cured body of the curable silicone composition of the invention does not change its color under the effect of UV rays or after long exposure to heat and therefore is suitable for use as an optical material for the manufacture of light-transmissive parts.

The curable silicone composition of the invention may also be compounded with an organopolysiloxane (C) that contains in one molecule at least one epoxy-containing organic group and is represented by the following average unit formula:

$$R^2_b SiO_{(4-b)/2}$$

(where $R^2$ is hydrogen atom or a univalent organic group, except for an aromatic group and a cycloalkyl group, at least one $R^2$ in one molecule being an epoxy-containing univalent organic group; and where the following condition is observed: $0 < b \leq 3$).

The following are examples of the aforementioned univalent organic group: a vinyl, allyl, butenyl, pentenyl, hexenyl, or a similar alkenyl group; a methyl, ethyl, propyl, butyl, pentyl, hexyl, heptyl, or a similar alkyl group; and a chloromethyl, 3-chloropropyl, 3,3,3-trifluoropropyl, or a similar halogenated alkyl group, as well as other substituted or unsubstituted univalent hydrocarbon groups. Preferably, $R^2$ is a univalent organic group, and most preferable univalent organic groups are univalent hydrocarbon groups, preferably, alkyl groups, and especially, methyl groups.

The aforementioned epoxy-containing univalent organic group may be represented by any univalent hydrocarbon group that contains an epoxy group, e.g., by a glycidoxyethyl, glycidoxypropyl, 3,4-epoxycyclohexylethyl, 3,4-epoxycyclohexylpropyl, 3,4-epoxynorbornenylethyl, 2-(3,4-epoxy-3-methylcyclohexyl)-2-methylethyl, etc. One molecule may contain one, two, or more of such epoxy-containing organic groups.

Organopolysiloxane (C) may have a linear, cyclic, or a branched molecular structure. The physical state at room temperature may be solid or liquid. There are no special restrictions with regard to the molecular weight and viscosity. However, from the point of view of better conditions for dispersion in component (A), it is preferable to use component (C) in a liquid form and to have a 25° C. viscosity within the range of 1 to 100000 mmPa·s. The most preferable component (C) is bis-glycidoxypropyl tetramethyldisiloxane.

If component (C) is a compound of low viscosity, the viscosity of the compound as a whole will be reduced, and, therefore, will be easier to handle.

There are no special restrictions with regard to the amounts of component (C) in the composition. It is recommended, however, to add component (C) in the amount of 0.01 to 100 parts by weight, preferably, 0.5 to 50 parts by weight, per 100 parts by weight of component (A).

If necessary, the curable composition of the invention may incorporate an inorganic filler. The inorganic filler will protect the composition from excessive flowability and at the same time will increase mechanical strength of the cured body.

It is recommended that the inorganic filler be comprised of a fine powder that will not impair properties of the curable silicone composition and optical characteristics of the cured body. This may be, e.g., a superfine powder of alumina, aluminum hydroxide, fused silica, crystalline silica, amorphous silica, hydrophobic silica, talc, barium sulfate, etc.

The inorganic filler can be added to the curable composition of the invention as it is, or can be formed in situ by causing a reaction inside the composition between the alkoxysilane, acyloxysilane, halogenated silane or a similar hydrogenizable silane monomer or oligomer and a halogenated compound, acyloxide, or alkoxide of a metal, such as titanium, aluminum, or the like, that may be added to the composition.

There are no special restrictions with regard to the amount of the inorganic filler that can be added to the composition. It may be recommended to add the inorganic filler in the amount of 1 to 50 wt. %, preferably, 1 to 30 wt. %, and even more preferably, 1 to 10 wt. %, per total weight of the composition. The composition may contain the inorganic filler of one type, two types, or more in a mixture.

For improvement of characteristics, the curable silicone composition of the invention can be combined with various thermosetting resins, such as epoxy resins, cyanate resins, phenolic resins, polyimide resins, urethane resins, etc. These resins are given as examples and should not be construed as limiting the scope of possible combinations. Most preferable are transparent epoxy resins as they provide superb transparency, adhesiveness, and other practical properties.

The aforementioned transparent epoxy resins can be exemplified by products of curing the below listed epoxy resins with a hexahydro anhydrous phthalic acid, methylhexahydro anhydrous phthalic acid, trialkyltetrahydro anhydrous phthalic acid, hydrogenated methylnadic acid anhydride, or similar aliphatic acid anhydride: bisphenol A diglycidyl ether, 2,2'-bis(4-glycidyloxycyclohexyl) propane, 3,4-epoxycyclohexyl methyl-3,4-epoxycyclohexane carboxylate, vinylcyclohexane dioxide, 2-(3,4-epoxycyclohexyl)-5,5-spiro-(3,4-epoxycyclohexane)-1,3-dioxane, bis(3,4-epoxycyclohexyl) adipate, 1,2-cyclopropane dicarboxylic acid bisglycidyl ester, triglycidyl isocyanurate, monoallyldiglycidyl isocyanurate, diallyldiglycidyl isocyanurate, or similar epoxy resins.

There are no special restrictions with regard to the amounts in which the thermosetting resin can be added to the composition, but in general it is recommended to add them in the amount of 1 to 50 wt. %, preferably, 1 to 30 wt. %, and even more preferably, 1 to 10 wt. %. The thermosetting resin can be used as one type or in combination of two or more types.

In order to improve adhesive properties of the curable silicone composition of the invention, the latter can be additionally combined with a silane coupling agent, titanate coupling agent, or a similar coupling agent. The silane coupling agent can be exemplified by N-(2-aminoethyl)-3-aminopropyl trimethoxysilane, 3-aminopropyl trimethoxysilane, N-phenyl-3-aminopropyltrimethoxysilane, or a similar amino-containing alkoxysilane; 3-mercaptopropyl trimethoxysilane, or a similar mercapto-containing alkoxysilane. The titanate coupling agents can be exemplified by i-propoxytitanium tri(1-isostearate).

There are no special restrictions with regard to the amounts in which the coupling agents can be added to the composition, but in general it is recommended to add them in the amount of 1 to 50 wt. %, preferably, 1 to 30 wt. %, and even more preferably, 1 to 10 wt. %. The coupling agent can be used as one type or in combination of two or more types.

The curable silicone composition of the invention can also be compounded with organic solvents, such as tetramethoxysilane, tetraethoxysilane, dimethyldimethoxysilane, methylphenyldimethoxysilane, methylphenyldiethoxysilane, phenyltrimethoxysilane, methyltrimethoxysilane, methyltriethoxysilane, vinyltrimethoxysilane, allyltrimethoxysilane, allyltriethoxysilane, or similar alkoxysilanes; hexane, pentane, or similar aliphatic solvents; toluene, xylene, or similar aromatic solvents; methylethylketone, methylisobutylketone, or similar ketone-type solvents.

There are no special limitations with regard to the amounts in which the organic solvent can be added, but in general it is recommended to add this solvent in the amount of 1 to 50 wt. %, preferably, 1 to 30 wt. %, and even more preferably, 1 to 10 wt. %. The solvent can be used as one type or in combination of two or more types.

If necessary, the curable silicone composition of the invention can be further combined with other additives within the limits that are not in conflict with the objects and effects of the invention. Such additives may be comprised, e.g., of fluorescent substances, such as cerium-activated yttrium-aluminum-garnet type fluorescent substances that, when they absorb the light of a light-emitting element, produce a long wavelength luminescent light; coloring agents, such as bluing agents that absorb specific wavelengths; titanium oxide, aluminum oxide, silicon oxide such as silica or quartz glass, talc, potassium carbonate, melamine resin, CTU guanamine resin, benzoguanamine resin, or other inorganic or organic light diffusion materials; glass, aluminosilicate, or similar metal oxides, aluminum nitride, boron nitride, or similar metal nitride for use as a heat radiating material; as well as age resistors, radical inhibitors, UV absorbants, adhesion improvers, flame retardants, surface-active agents, storage stabilizers, antiozonants, optical stabilizers, thickeners, plasticizers, antioxidants, thermal stabilizers, conductivity imparting agents, antistatic agents, radiation shielding agents, nucleating agents, phosphorus-based peroxide decomposing agents, lubricants, pigments, metal deactivation agents, physical property adjusting agents, etc.

There are no special limitations with regard to the amounts in which the aforementioned additives can be added to the composition, but in general it is recommended to add these additives in the amount of 1 to 50 wt. %, preferably, 1 to 30 wt. %, and even more preferably, 1 to 10 wt. %. The additives can be used as one type or in combination of two or more types. When two or more types are used, they can be added in equal or different proportions.

The curable silicone composition of the invention is prepared by uniformly mixing aforementioned components (A) and (B) and then (C), if necessary, with other arbitrary components. There are no special restrictions with regard to the method of mixing. For example, the composition can be prepared by the following methods: mixing only components (A) and (B); simultaneously mixing components (A), (B), and (C); premixing components (A) and (C) and then adding component (B); mixing components (A) and (B) with appropriate additives and then mixing them together. There are no restriction also with regard to the equipment that can be used for mixing components (A), (B), (C), and arbitrary additives. The equipment is selected depending on whether the components (A) and (B) are liquid, solid, or powdered. Examples of the mixing equipment include single-shaft or dual-shaft continuous mixers, two-roll mixers, Ross mixers, Hobart mixers, dental mixers, planetary mixers, kneader mixers, etc.

The curable silicone composition of the invention and a cured body obtained from this composition should have a refractive index (25° C.) in visible light of 589 nm that is no less than 1.5 and/or light transmittance (25° C.) in visible light of 420 nm that is no less than 80%. If the refractive index is less than 1.5 and/or the light transmittance is lower than 80%, it would be impossible to provide sufficient reliability of the optical parts or elements that are coated with the use of such silicone compositions or cured bodies of these compositions.

The refractive index can be measured, e.g., with an Abbe refractometer. In this case, the refractive index can be measures at an arbitrary wavelength that can be adjusted by changing the wavelength of the light sources used in the Abbe refractometer. The light transmittance can be measured, e.g., with a spectrophotometer that has a 1.00 mm-long optical path.

A cured body of the curable silicone composition of the invention is produced as an elastomer that may be, in particular, in a gel-like, soft-rubber like, or resin-like form. Therefore, the cured body of the composition is suitable for use in electrical and electronic parts and devices as an adhesive agent, potting agent, protective coating, and underfiller. In view of its high light-transmitting properties in the range of visible light, it is especially suitable for use in optics as an adhesive, potting agent, sealing agent, protective coating, and underfiller of optical elements.

In particular, in view of its high light-transmitting properties, the curable silicone composition of the invention is most suitable for use in optical products. In the context of the present patent application, the term "optical products" covers any products that have light transmissive parts. The curable composition and the cured body of the invention are suitable for use in conjunction with the aforementioned light transmissive parts. Here, the term "light" can be defined as visible light, infrared light, ultraviolet light, or other electromagnetic-wave based light. The curable composition and the cured body of the invention may be embodied in any suitable form, such as adhesives, sealants, coating agents, films, sheets, lenses, etc.

PRACTICAL EXAMPLES

The invention will be further described with reference to practical examples.

In the subsequent examples, viscosities of the cured silicone compositions and cured products, average molecular weights, indices of refraction, heat-resistant properties, UV-resistant properties, and light-transmitting properties were measured by the methods described below.

[Viscosity]
Viscosity was measured at 25° C. and 2.5 rpm by means of an E-type viscometer (TOKIMEC Co., Digital Viscometer, Model DV-U-E II).

[Average Molecular Weight]
The average molecular weight was determined as a weight-average molecular weight referenced to polystyrene and measured by GPC with THF as a solvent.

[Refractive Index]
The refractive index was measured at 25° C. with the use of an Abbe refractometer. A light source used for measurement was a visible-light (589 nm) radiation-type source.

[Heat-Resistant Properties]
Heat-resistant properties were evaluated by visually observing degree of coloring after holding the product for 2 hours in a 180° C. hot-air circulation type oven.

[UV-Resistant Properties]
A 5 g sample of component (A) or the curable silicone composition was loaded into a 10 cm$^3$ glass sampling bottle (diameter 15 mm, height 45 mm). The sample material contained in the sampling bottle was then irradiated for 5 hours at a distance of 17 cm from above the bottle with a high-pressure mercury lamp (ULV-4000-O/N, lamp input power 120 W/cm) of a UV irradiation tester (Ushio Denki Co., Ltd., Model UVC-253). Upon completion of the test, the test material was visually observed for evaluating the degree of coloring. For evaluating UV-resistance of the cured body of the curable silicone composition, the measurements were carried out by the same method as above after the cured body was obtained by curing the composition.

[Light Transmittance]
Light transmittance was measured on a 1.0 mm-thick sample (1.0 mm-long optical path) of component (A) or curable silicone composition at 25° C. in a visible light of 420 nm wavelength. For evaluating light transmittance through the cured body of the curable silicone composition, the measurements were carried out by the same method as above after the cured body was obtained by curing the composition.

Practical Example 1

A 500 ml-flask equipped with a thermometer, a Dean-Stark tube, and a reflux cooler was loaded with 98.0 g of cyclohexyltrimethoxysilane, 10.3 g of 3-glycidoxypropylmethyldimethoxysilane, 10.9 g of dimethyldimethoxysilane, 80 g of toluene, and 0.13 g of potassium hydroxide. The system was combined with 30.8 g of water, and then the methanol and water were evaporated by heating the mixture. When water was completely removed, the system was cooled, and 20.0 g of water and toluene was added again. Following this, the system was heated, and the formed methanol and water were removed via evaporation. 20 g of water were added again, the formed methanol and water were removed via evaporation, and the product was subjected to 6 hour heating and refluxing. Upon cooling, 0.20 g of acetic acid was added, and the system was neutralized. Toluene was then added, and the product was washed three times with 80 ml of water. The obtained toluene solution was poured into a 500 ml flask equipped with a Dean-Stark tube, and the contents were subjected to azeotropic dehydration. Impurities were separated by filtering, toluene was removed via evaporation by heating the filtrate under a reduced pressure, and as result, 78 g of a colorless transparent solid substance were obtained.

It was confirmed that the obtained colorless transparent substance comprised a silicone resin that contained 3-glycidoxypropyl groups and cyclohexyl groups and was represented by the following average unit formula:

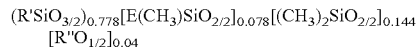

(where R' is a cyclohexyl group, E is a 3-glycidoxypropyl group, and R" is H or CH$_3$); The obtained substance had the following characteristics—average molecular weight: 2930; softening point: about 70° C.; epoxy equivalent: 2030.

The silicone resin obtained in Practical Example 1 was measured with regard to the index of refraction, resistance to heat, resistance to UV radiation, and light-transmitting properties prior to and after exposure to UV radiation. The results of measurements are shown in Table 1.

Practical Example 2

A 500 ml-flask equipped with a thermometer, a Dean-Stark tube, and a reflux cooler was loaded with 77.1 g of cyclohexyltrimethoxysilane, 11.2 g of octamethyltetracyclosiloxane, 6.8 g of water, and 0.06 g of trifluoromethane sulfonic acid. The formed methanol was evaporated by heating. The system was combined with 78 g of toluene, 0.17 g of potassium hydroxide, 22.2 g of 3-glycidoxypropyl methyldimethoxysilane, and 34.4 g of water. Following this, the system was heated, and the formed methanol and water were removed via evaporation. After the water was completely removed, the system was cooled and again combined with 20.0 g of water and toluene. The formed methanol and water were evaporated by heating, and the system was subjected to 6 hour heating and refluxing. Upon cooling, 0.23 g of acetic acid was added, and the system was neutralized. Toluene was then added, and the product was washed three times with 80 ml of water. The obtained toluene solution was poured into a 500 ml flask equipped with a Dean-Stark tube, and the contents were subjected to azeotropic dehydration. Impurities were separated by filtering, toluene was removed via evaporation by heating the filtrate under a reduced pressure, and as result, 73 g of a colorless viscous paste-like substance were obtained.

It was confirmed that the obtained colorless paste comprised a silicone resin that contained 3-glycidoxypropyl groups and cyclohexyl groups and was represented by the following average unit formula:

$$(R'SiO_{3/2})_{0.723}[E(CH_3)SiO_{2/2}]_{0.117}[(CH_3)_2SiO_{2/2}]_{0.16}[R''O_{1/2}]_{0.07}$$

(where R' is a cyclohexyl group, E is a 3-glycidoxypropyl group, and R'' is H or $CH_3$);

The obtained substance had the following characteristics—average molecular weight: 4940; epoxy equivalent: 1310.

The silicone resin obtained in Practical Example 2 was measured with regard to the index of refraction, resistance to heat, resistance to UV radiation, and light-transmitting properties prior to and after exposure to UV radiation. The results of measurements are shown in Table 1.

Practical Example 3

A 500 ml-flask equipped with a thermometer, a Dean-Stark tube, and a reflux cooler was loaded with 78.7 g of cyclohexyltrimethoxysilane, 22.7 g of 3-glycidoxypropylmethyldimethoxysilane, 18.5 g of dimethyldimethoxysilane, 79 g of toluene, and 0.16 g of potassium hydroxide. The system was combined with 30.1 g of water, and water and the formed methanol were evaporated by heating. After the water was completely removed, the system was cooled and again combined with 10.0 g of water and toluene. The formed methanol and water were evaporated by heating, and the system was subjected to 6 hour heating and refluxing. Upon cooling, 0.24 g of acetic acid was added, and the system was neutralized. Toluene was then added, and the product was washed three times with 80 ml of water. The obtained toluene solution was poured into a 500 ml flask equipped with a Dean-Stark tube, and the contents were subjected to azeotropic dehydration. Impurities were separated by filtering, toluene was removed via evaporation by heating the filtrate under a reduced pressure, and as result, 75 g of a colorless transparent liquid substance were obtained.

It was confirmed that the obtained colorless transparent liquid substance comprised a silicone resin that contained 3-glycidoxypropyl groups and cyclohexyl groups and was represented by the following average unit formula:

$$(R'SiO_{3/2})_{0.607}[E(CH_3)SiO_{2/2}]_{0.158}[(CH_3)_2SiO_{2/2}]_{0.235}[R''O_{1/2}]_{0.276}$$

(where R' is a cyclohexyl group, E is a 3-glycidoxypropyl group, and R'' is H or $CH_3$);

The obtained substance had the following characteristics—average molecular weight: 2300; viscosity: $1.4 \times 10^4$ mPa·s; epoxy equivalent: 940.

The silicone resin obtained in Practical Example 3 was measured with regard to the index of refraction, resistance to heat, resistance to UV radiation, and light-transmitting properties prior to and after exposure to UV radiation. The results of measurements are shown in Table 1.

Practical Example 4

A 500 ml-flask equipped with a thermometer, a Dean-Stark tube, and a reflux cooler was loaded with 63.7 g of cyclohexyltrimethoxysilane, 41.3 g of 3-glycidoxypropylmethyldimethoxysilane, 33.7 g of dimethyldimethoxysilane, 94 g of toluene, and 0.19 g of potassium hydroxide. The system was combined with 67.4 g of water, and water and the formed methanol were evaporated by heating. After the water was completely removed, the system was cooled and again combined with 20.0 g of water and toluene. The formed methanol and water were evaporated by heating, and the system was subjected to 6 hour heating and refluxing. Upon cooling, 0.29 g of acetic acid was added, and the system was neutralized. Toluene was then added, and the product was washed three times with 80 ml of water. The obtained toluene solution was poured into a 500 ml flask equipped with a Dean-Stark tube, and the contents were subjected to azeotropic dehydration. Impurities were separated by filtering, toluene was removed via evaporation by heating the filtrate under a reduced pressure, and as result, 89 g of a colorless transparent liquid substance were obtained.

It was confirmed that the obtained colorless transparent liquid substance comprised a silicone resin that contained 3-glycidoxypropyl groups and cyclohexyl groups and was represented by the following average unit formula:

$$(R'SiO_{3/2})_{0.404}[E(CH_3)SiO_{2/2}]_{0.239}[(CH_3)_2SiO_{2/2}]_{0.357}[R''O_{1/2}]_{0.032}$$

(where R' is a cyclohexyl group, E is a 3-glycidoxypropyl group, and R'' is H or $CH_3$);

The obtained substance had the following characteristics—average molecular weight: 3340; viscosity: $6.1 \times 10^4$ mPa·s; epoxy equivalent: 540.

The silicone resin obtained in Practical Example 4 was measured with regard to the index of refraction, resistance to heat, resistance to UV radiation, and light-transmitting properties prior to and after exposure to UV radiation. The results of measurements are shown in Table 1.

Comparative Example 1

A 2000 ml flask equipped with a thermometer and a reflux cooler was loaded with 250 g of water and 400 g of toluene. The contents were cooled on an ice bath, and during cooling a mixture of 300 g phenyltrichlorosilane and 200 g toluene was added dropwise. When addition of the mixture was completed, the mixture was refluxed for 6 hours with heating, and the toluene solution was separated. The obtained toluene solution was repeatedly washed with water unit complete neutralization of the washing liquid. The toluene was evaporated by heating the toluene solution under a reduced pressure. As a result, 177.7 g of a white solid substance were obtained.

116.0 g of the obtained white solid substance, 20.2 g of 3-glycidoxypropyl-methyldimethoxysilane, 19.1 g of dimethyldimethoxysilane, 150 g of toluene, and 0.15 g of cesium hydroxide were loaded into a 500 ml flask equipped with a Dean-Stark tube and a reflux cooler. The system was combined with 10.0 g of water, and water and the formed methanol were evaporated by heating. After the water was completely removed, the system was cooled and again combined with 10.0 g of water. The formed methanol and water were evaporated by heating, and the system was subjected to 6 hour heating and refluxing. Upon cooling, 0.08 g of acetic acid was added, and the system was neutralized. The product was washed three times with 80 ml of water. The obtained toluene solution was poured into a 500 ml flask equipped with a Dean-Stark tube, and the contents were subjected to azeotropic dehydration. Impurities were separated by filtering, toluene was removed via evaporation by heating the filtrate under a reduced pressure, and as result, 140 g of a colorless transparent solid substance were obtained.

It was confirmed by $^{29}$Si-NMR spectral analysis that the obtained colorless transparent solid substance comprised a silicone resin that contained 3-glycidoxypropyl groups and phenyl groups and was represented by the following average unit formula:

$$(PhSiO_{3/2})_{0.79}[(CH_3)_2SiO_{2/2}]_{0.14}[E(CH_3)SiO_{2/2}]_{0.07}$$

(where Ph is a phenyl group, and E is a 3-glycidoxypropyl group).

The obtained substance had the following characteristics—average molecular weight: 2600; softening point: 73° C.; melt viscosity at 100° C.: $54 \times 10^4$ mPa·s; melt viscosity at 160° C.: 3200 mPa·s; epoxy equivalent: 1620.

The silicone resin obtained in Comparative Example 1 was measured with regard to the index of refraction, resistance to heat, resistance to UV radiation, and light-transmitting properties prior to and after exposure to UV radiation. The results of measurements are shown in Table 1.

Comparative Example 2

The index of refraction, resistance to heat, resistance to UV radiation, and light-transmitting properties prior to and after exposure to UV radiation were measured in a polydimethylsiloxane [of Comparative Example 2] having both molecular terminals capped with vinyldimethylsilyl groups (viscosity: 400 mPa·s). The results of measurement are shown in Table 1.

Comparative Example 3

The index of refraction, resistance to heat, resistance to UV radiation, and light-transmitting properties prior to and after exposure to UV radiation were measured in a polymethylphenylsiloxane [of comparative Example 3] having both molecular terminals capped with vinyldimethylsilyl groups (viscosity: 1000 mPa·s). The results of measurement are shown in Table 1.

TABLE 1

|  | Practical Examples | | | | Comparative Examples | | |
| --- | --- | --- | --- | --- | --- | --- | --- |
|  | 1 | 2 | 3 | 4 | 1 | 2 | 3 |
| Refractive Index | 1.49 | 1.48 | 1.47 | 1.47 | 1.56 | 1.41 | 1.53 |
| Appearance | Solid, transparent, colorless | Viscous, transparent, colorless | Liquid, transparent, colorless | Liquid, transparent, colorless | Solid, transparent, colorless | Liquid, transparent, colorless | Liquid, transparent, colorless |
| Resistance to Heat | Transparent, colorless | Transparent, colorless | Transparent, colorless | Transparent, colorless | Transparent, colorless | Transparent, colorless | Transparent, colorless |
| Resistance to UV Radiation | Transparent, colorless | Transparent, colorless | Transparent, colorless | Transparent, colorless | Pale yellow | Transparent, colorless | Pale yellow |
| Light Transmittance prior to UV Irradiation (%) | 98 | 98 | 98 | 98 | 99 | 99 | 99 |
| Light Transmittance after UV Irradiation (%) | 97 | 97 | 97 | 97 | 71 | 99 | 72 |

Practical Example 5

A curable liquid disilicone composition was prepared by mixing 78.0 parts by weight of the silicone resin synthesized in Practical Example 1 as component (A), 3.3 parts by weight of γ-glycidoxypropyltrimethoxysilane and 1.7 parts by weight of acetoalkoxyaluminum diisopropylate as component (B), and 17.0 of bis-glycidoxypropyltetramethyldisiloxane as component (C). After defoaming in vacuum, the composition was cured by heating in a hot-air circulation type oven for 30 min. at 125° C. and for 1 hour at 150° C. As a result, a cured body of high hardness was obtained.

The cured body obtained in Practical Example 5 was measured with regard to the index of refraction, resistance to heat, resistance to UV radiation, and light-transmitting properties prior to and after exposure to UV radiation. The results of measurements are shown in Table 2.

Practical Example 6

A curable liquid silicone composition was prepared by mixing 89.6 parts by weight of the silicone resin synthesized in Practical Example 3 as component (A), 8.5 parts by weight of component (B) in the form of a 2.0 parts by weight of acetoalkoxyaluminum diisopropylate and a polyorganosiloxane capped at both molecular terminals with silanol groups and represented by the following structural formula:

HO—[—(CH$_3$)$_2$SiO—]$_5$[—(CH$_3$)(CH$_2$=CH)
    SiO—]—H, and 17.0 parts by weight of bis-glycidoxypropyltetramethyldisiloxane as component (C). After defoaming in vacuum, the composition was cured by heating in a hot-air circulation type oven for 30 min. at 125° C. and for 1 hour at 150° C. As a result, a cured body of high hardness was obtained.

The cured body obtained in Practical Example 6 was measured with regard to the index of refraction, resistance to heat, resistance to UV radiation, and light-transmitting properties prior to and after exposure to UV radiation. The results of measurements are shown in Table 2.

Comparative Example 4

A curable silicone composition was prepared by mixing 54.3 parts by weight of a branch-chained organopolysiloxane represented by the following average unit formula:

$(C_6H_5SiO_{3/2})_{0.75}[(CH_2=CH)(CH_3)_2Si_{1/2}]_{0.25}$ (at room temperature—white transparent solid substance; content of silicon-bonded vinyl groups in silicon-bonded organic groups is 17 mole %; content of silicon-bonded phenyl groups in silicon-bonded organic groups is 50 mole %; polystyrene referenced weight-average molecular weight is 1600), 45.7 parts by weight of a branch-chained organopolysiloxane represented by the following average unit formula:

$(C_6H_5SiO_{3/2})_{0.60}[(H(CH_3)_2SiO_{1/2}]_{0.40}$ (content of silicon-bonded hydrogen atoms in all silicon-bonded groups silicon-bonded organic groups is 22 mole %; content of silicon-bonded phenyl groups in all silicon-bonded groups is 33 mole %; polystyrene referenced weight-average molecular weight is 1100), a platinum-divinyltetramethyldisiloxane complex (5 ppm per total composition), 0.05 parts by weight of a tetramethyltetravinylcyclosiloxane. After defoaming in vacuum, the composition was cured by heating in a hot-air circulation type oven for 30 min. at 125° C. and for 1 hour at 150° C. As a result, a cured body of high hardness was obtained.

The cured body obtained in Comparative Example 4 was measured with regard to the index of refraction, resistance to heat, resistance to UV radiation, and light-transmitting properties prior to and after exposure to UV radiation. The results of measurements are shown in Table 2.

Comparative Example 5

A curable silicone composition was prepared by mixing 97.3 parts by weight of a polydimethylsiloxane having both molecular terminals capped with vinyldimethylsilyl groups (viscosity of 400 mPa·s), 2.7 parts by weight of a polymethylhydrogensiloxane capped at both molecular terminal with trimethylsilyl groups (viscosity of 5 mPa·s), a platinum-divinyltetramethyldisiloxane complex (5 ppm per total composition), and 0.05 parts by weight of a tetramethyltetravinylcyclosiloxane. After defoaming in vacuum, the composition was cured by heating in a hot-air circulation type oven for 30 min. at 125° C. and for 1 hour at 150° C. As a result, a soft rubber-like cured body was obtained.

The cured body obtained in Comparative Example 5 was measured with regard to the index of refraction, resistance to heat, resistance to UV radiation, and light-transmitting properties prior to and after exposure to UV radiation. The results of measurements are shown in Table 2.

Comparative Example 6

A curable silicone composition was prepared by mixing 91 parts by weight of a polymethylphenylsiloxane capped at both molecular terminals with vinyldimethylsilyl groups (viscosity of 1000 mPa·s), 9 parts by weight of a polymethylhydrogensiloxane (viscosity of 25 mPa·s) represented by the following unit formula:

$[(H(CH_3)_2SiO_{1/2}]_{0.60}[SiO_{4/2}]_{0.40}$, a platinum-divinyltetramethyldisiloxane complex (5 ppm per total composition), and 0.05 parts by weight of a tetramethyltetravinylcyclosiloxane. After defoaming in vacuum, the composition was cured by heating in a hot-air circulation type oven for 30 min. at 125° C. and for 1 hour at 150° C. As a result, a soft rubber-like cured body was obtained.

The cured body obtained in Comparative Example 6 was measured with regard to the index of refraction, resistance to heat, resistance to UV radiation, and light-transmitting properties prior to and after exposure to UV radiation. The results of measurements are shown in Table 2.

TABLE 2

|  | Practical Examples | | Comparative Examples | | |
| --- | --- | --- | --- | --- | --- |
|  | 5 | 6 | 4 | 5 | 6 |
| Index | 1.49 | 1.48 | 1.52 | 1.41 | 1.52 |
| Appearance | Transparent, colorless | Transparent, colorless | Transparent, colorless | Transparent, colorless | Transparent, colorless |
| Resistance to Heat | Transparent, colorless | Transparent, colorless | Transparent, colorless | Pale yellow | Transparent, colorless |
| Resistance to UV Radiation | Transparent, colorless | Transparent, colorless | Pale yellow | Pale yellow | Pale yellow |
| Light Transmittance prior to UV Irradiation (%) | 96 | 96 | 97 | 99 | 97 |
| Light Transmittance after UV Irradiation (%) | 93 | 94 | 65 | 91 | 60 |

INDUSTRIAL APPLICABILITY

There are no special restrictions with regard to the types of the aforementioned optical products that can be embodied as follows:

(1) substrates, light-guide plates, prism sheets, polarization plates, phase-shift plates, viewing angle correction films, polarization element protection films, liquid-crystal films, etc., for liquid-crystal displays;

(2) substrates, reflection preventing films, optical correction films, housing materials, front glass protective films, front glass substituting materials, etc., for plasma displays;

(3) substrates, light-emitting diodes, light-emitting elements other than light-emitting diodes, front-glass protective films, front-glass substituting materials, etc., for light-emitting diode displays;

(4) substrates, light guide plates, prism sheets, polarization plates, phase-shift plates, polarization element protective films, etc., for plasma address liquid crystal (PALC) displays;
(5) substrates, front glass protective films, front glass substituting materials, etc., for organic EL (electroluminescence) displays;
(6) substrates, front glass protective films, front glass substituting materials, etc., for field emission displays (FED);
(7) substrates for VD (video disks), CD/CD-ROM, CD-R/RW, DVD-R/DVD-RAM, MO/MD, PD (phase change disks), optical cards, pickup lenses, protective films;
(8) lenses, finder prisms, target prisms, finder covers, and light-receiving sensors for still cameras;
(9) lenses, CCD elements, finders for video cameras;
(10) projection lenses and protective films for projection TV;
(11) lenses and films for optical sensing devices;
(12) optical switches, lenses, and waveguides for optical communication systems;
(13) lenses and waveguides for optical passive components;
(14) various light emitting elements, elements of optical amplifiers, optical operation elements;
(15) substrates and fiber materials for optical integration circuits;
(16) cores or clads, connectors, and films for optical fibers;
(17) optical sensors, displays, and signs for industrial application;
(18) resist materials for semiconductor integrated circuits, LSI, super LSU materials, etc.;
(19) lamp reflectors, switch parts, head lamps, electrical parts, various indoor/outdoor parts, glass substitution material etc. for automotives or transports
(20) interior and structural materials, electric covers, sheets, glass intermediate films, glass substitution materials, solar batteries, etc., for the construction industry;
(21) covers for agricultural houses.

Among the optical products, the curable silicone compositions and cured bodies of the invention are most suitable for light emitting diodes (LED's), photocouplers, CCD's, etc.

The invention claimed is:

1. A curable silicone composition comprising:
an organopolysiloxane (A) that contains in one molecule at least one epoxy-containing organic group, has a polystyrene-referenced weight-average molecular weight of at least 500, and is expressed by the following general unit formula:

$$(RSiO_{3/2})_x[R^1_a SiO_{(4-a)/2}]_y$$

where R represents a cycloalkyl group selected from the group consisting of cyclopropyl, cyclobutyl, cyclopentyl, cyclohexyl, and cycloheptyl, at least one $R^1$ in one molecule represents an epoxy-containing univalent organic group with remaining $R^1$ representing a hydrogen atom or a univalent organic group except for an aromatic group and a cycloalkyl group, and where the following condition is observed: $0<a\leq3$; $0.2\leq x\leq0.9$; $0.1\leq y\leq0.8$; and $x+y=1$;
a curing agent (B) for curing said component (A); and
an organopolysiloxane (C) that contains in one molecule at least one epoxy-containing organic group and that is represented by the following average unit formula:

$$R^2_b SiO_{(4-b)/2}$$

where at least one $R^2$ in one molecule represents an epoxy-containing univalent organic group with remaining $R^2$ representing a hydrogen atom or a univalent organic group except for an aromatic group and a cycloalkyl group, and where the following condition is observed: $0.1<b\leq3$.

2. The curable silicone composition of claim 1, wherein said component (C) has a viscosity within the range of 1 to 100000 mPa·s at 25° C.

3. The curable silicone composition according to claim 1, wherein said component (B) is a combination of a silicon-bonded alkoxy compound or a silanol-containing compound with an organoaluminum compound.

4. The curable silicone composition according to claim 1, wherein said curable silicone composition is in a liquid or a paste-like form.

5. A cured body of the curable silicone composition according to claim 1.

6. An optical part comprising said cured body of claim 5.

7. The curable silicone composition according to claim 1, wherein said component (B) is a combination of a silicon-bonded alkoxy compound; a silanol-containing compound of the following formula:

$$HOSiR^3R^4-(OSiR^5R^6)_m-OSiR^7R^8OH$$

where $R^3$, $R^4$, $R^5$, $R^6$, $R^7$, and $R^8$ independently designate univalent organic groups, and "m" is an integer within the range of 1 to 30; or an active hydrogen-containing compound; with an organoaluminum compound.

* * * * *